(12) United States Patent
Luo et al.

(10) Patent No.: US 10,789,166 B2
(45) Date of Patent: Sep. 29, 2020

(54) COMPUTER SYSTEM

(71) Applicant: Hitachi, Ltd., Chiyoda-ku, Tokyo (JP)

(72) Inventors: Cheng Luo, Tokyo (JP); Machiko Asaie, Tokyo (JP); Keiro Muro, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 28 days.

(21) Appl. No.: 16/333,744

(22) PCT Filed: Aug. 3, 2017

(86) PCT No.: PCT/JP2017/028297
§ 371 (c)(1),
(2) Date: Mar. 15, 2019

(87) PCT Pub. No.: WO2019/026252
PCT Pub. Date: Feb. 7, 2019

(65) Prior Publication Data
US 2019/0361809 A1 Nov. 28, 2019

(51) Int. Cl.
*G06F 12/08* (2016.01)
*G06F 12/0802* (2016.01)

(52) U.S. Cl.
CPC ...... *G06F 12/0802* (2013.01); *G06F 2212/60* (2013.01)

(58) Field of Classification Search
CPC ...... G06F 12/00; G06F 12/08; G06F 12/0802; G06F 2212/60; G06F 16/24552; G06F 9/48; G06F 9/52; G06F 9/46; G06F 3/0647; G06F 3/06
USPC ...... 711/118
See application file for complete search history.

(56) References Cited

U.S. PATENT DOCUMENTS

| 10,152,340 | B2* | 12/2018 | Sivathanu | G06F 12/0868 |
| 2005/0039206 | A1* | 2/2005 | Opdycke | G06Q 30/0277 725/35 |
| 2007/0186036 | A1* | 8/2007 | Bittner, Jr. | G11C 15/00 711/108 |
| 2010/0274984 | A1* | 10/2010 | Inomata | G06F 3/0647 711/162 |
| 2014/0067920 | A1 | 3/2014 | Hsieh et al. | |
| 2016/0292076 | A1* | 10/2016 | Lee | G06F 16/22 |

* cited by examiner

*Primary Examiner* — Mano Padmanabhan
*Assistant Examiner* — Jean C Edouard
(74) *Attorney, Agent, or Firm* — Procopio, Cory, Hargreaves & Savitch LLP

(57) ABSTRACT

A computer system acquires information on a first present input subset selected from first present input data for a first step from a run-time log of the first step, determines whether or not first cache data corresponding to the first present input subset for the first step is present in a cache area with reference to management information, and determines the first cache data as present output data for the first present input data in a case where the first cache data is present.

10 Claims, 9 Drawing Sheets

STEP TABLE 400

| STEP ID | STEP NAME | DETAILS | STEP TYPE | RUN-TIME LOG PATH | CACHE SIZE | CACHE DEVICE | CACHE REPLACEMENT POLICY |
|---|---|---|---|---|---|---|---|
| 1 | PCA | PCA to reduce columns | B | C:/xx/xxx.log | 3 | M | FIFO |
| 2 | Decision Tree | | C | - | - | - | - |
| 3 | Column filter | | A | - | All | D | LRU |

ORIGINAL DATA TABLE 410

| DATA ID | DATA NAME | DETAILS | CREATION TIME | COLUMN SET STORAGE PATH | DATA STORAGE PATH |
|---|---|---|---|---|---|
| 20160102001 | metaldata 2016 | Sensor data of product B in factory A in 2016 | 2017/1/13 13:00:12 | C:/xx/xx | C:/data/data.csv |

STEP INSTANCE TABLE 420

| INSTANCE ID | NAME | STEP ID | CREATION TIME |
|---|---|---|---|
| 1 | PCA_1 | 1 | 2017-2-1 13:00:12 |
| 2 | DT_2 | 2 | 2017-2-1 13:00:12 |

ACS TABLE 430

| ACS ID | DATA ID | INSTANCE ID | ACS | ALL-COLUMN SET | CREATION TIME | CACHE KEY ID |
|---|---|---|---|---|---|---|
| 1 | 10001 | 13 | {temp, voltage, current} | {temp, voltage, current, height} | 2017-2-1 13:00 12 | 2 |
| 431 | 432 | 433 | 434 | 435 | 436 | 437 |

[FIG. 4E]

CACHE MANAGEMENT TABLE 440

| CACHE ID | STEP INSTANCE ID | DATA ID | COLUMN NAME | CREATION TIME | FINAL ACCESS TIME | ACCESS FREQUENCY | CACHE DATA PATH |
|---|---|---|---|---|---|---|---|
| 1001 | 31 | 20160102001 | current | 2017-2-1 12:00 | 2017-2-1 15:00 | 2 | C:xxx/xxx |
| 441 | 442 | 443 | 444 | 445 | 446 | 447 | 448 |

[FIG. 4F]

CACHE KEY TABLE 450

| KEY ID | STEP INSTANCE ID | DATA ID | INPUT COLUMN | COLUMN NAME | CREATION TIME | CACHE ID |
|---|---|---|---|---|---|---|
| 1 | 31 | 20160102001 | {tem, volt} | current | 2017-2-1 12:00 | 1001 |
| 451 | 452 | 453 | 454 | 455 | 456 | 457 |

COMPUTER SYSTEM

CROSS-REFERENCE TO RELATED APPLICATIONS

This application is a U.S. National Stage entry of PCT Application No: PCT/JP2017/028297 filed Aug. 3, 2017, the contents of which are incorporated herein by reference.

TECHNICAL FIELD

The present invention relates to a computer system.

BACKGROUND ART

With the spread of information equipment, data sources have become increasingly abundant. In addition to traditional manual input and system calculation data, available data is increasing exponentially every hour as a result of the Internet and Internet of things (IoT).

Sensors are the most important data sources in fields such as manufacturing. Products of companies include a large number of components. Components are manufactured in different product lines within a factory. Dozens, hundreds, or thousands of sensors are usually installed in product lines to monitor and collect real-time sensor data. Sensor data is accumulated, and detailed information on product manufacture is recorded.

In order to achieve an improvement in product quality, failure avoidance, and the like, 100 GB or TB level sensor data is used as an input to a data analysis system for specific analysis purposes such as predictive maintenance. The data analysis system includes an analysis platform. The analysis platform is connected to a large number of tools or software for performing data preprocessing, analysis, and chart creation. The analysis platform provides steps, and data is processed using a function in each of the steps. A series of steps constitute a workflow by which analysis results for input data can be output.

A data analysis workflow is created in a specific data type for a specific purpose. Creating a workflow may require not only participation of IT engineers but also participation of domain experts. After a workflow is created, a user generates analysis results using data of all available sensors or some sensors as inputs of the created workflow.

Since input data is usually extremely large, it takes a long time to analyze data using a workflow. A user selects the most relevant estimated sensor data as an input of a first trial in cooperation with a domain expert. Based on a first result, another sensor data is added as an input for executing the subsequent retrial of the workflow.

For example, PTL 1 discloses a method of updating a cache memory at the time of execution of a data flow. PTL 2 discloses big data analysis using cache data.

CITATION LIST

Patent Literature

PTL 1: US 2016/0292076
PTL 2: US 2014/0067920

SUMMARY OF INVENTION

Technical Problem

As described above, a data processing workflow in the related art requires much time for processing a large amount of data. A data caching method in the related art requires a large cache area to cache all possible data. Therefore, an efficient data caching method capable of realizing high-speed processing of a large amount of data in a data processing workflow in a limited cache area is desired.

Solution to Problem

According to an aspect of the present disclosure, there is provided a computer system performing cache management of intermediate data in a data processing workflow in which a plurality of steps are sequentially executed, the computer system including a storage device that includes a cache area for storing cache data, and a processor that is operated in accordance with a command code stored in the storage device, in which the storage device stores a run-time log of a first step being executed among the plurality of steps and management information indicating a relationship between an input subset which is a portion of input data to the first step and is constituted by a plurality of data units and cache data of output data of the first step for the input subset, output data units of the first step are generated from the input subset, and the processor acquires information on a first present input subset selected from first present input data for the first step from the run-time log of the first step, determines whether or not first cache data corresponding to the first present input subset for the first step is present in the cache area with reference to the management information, and determines the first cache data as present output data for the first present input data in a case where the first cache data is present.

Advantageous Effects of Invention

According to an aspect of the present disclosure, it is possible to provide efficient cache management for improving the performance of a data processing workflow.

DESCRIPTION OF EMBODIMENTS

Hereinafter, an embodiment of the present invention will be described with reference to the accompanying drawings. It should be noted that the present embodiment is merely an example for implementing the present invention and does not limit the technical scope of the present invention. Hereinafter, a caching technique in a data processing system will be disclosed. The caching technique in the present disclosure can be applied to, for example, data analysis using big data obtained from a plurality of sensors. This caching technique can improve data processing performance of a large amount of data within a system having a limited cache area.

Figure 1:
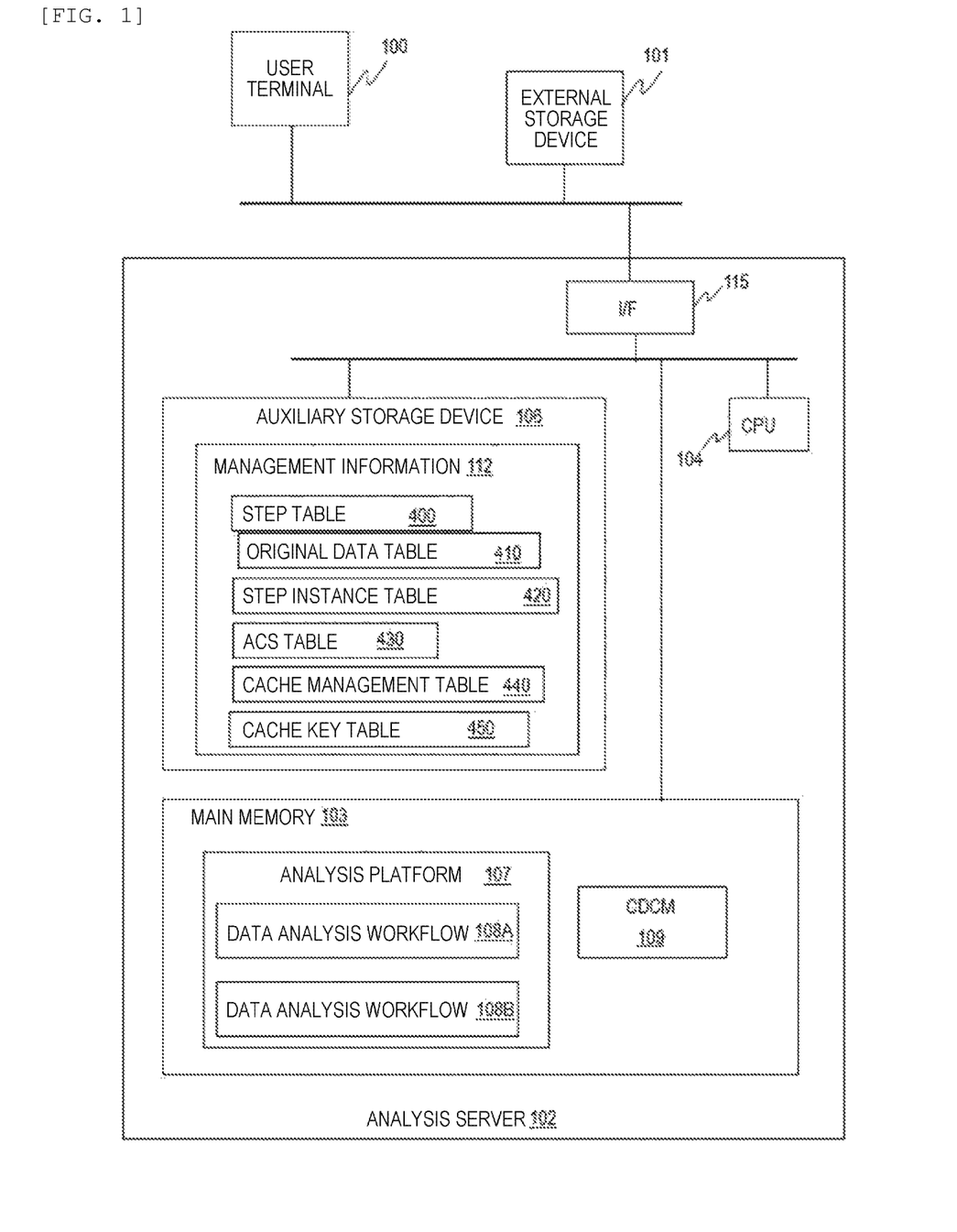
FIG. 1 schematically shows a configuration example of a computer system.

FIG. 1 schematically shows a configuration example of a computer system according to an embodiment. The computer system is described through a network, and includes a user terminal 100, an external storage device 101, and an analysis server 102. The user terminal 100 may have a general computer configuration.

The user terminal 100 may include a memory, a processor which is operated in accordance with programs (command codes) stored in the memory, an auxiliary storage device, and an input and output device. The external storage device 101 is configured to include a network interface and one or a plurality of storage devices. The storage device is a nonvolatile storage device such as a solid state drive (SSD) or a hard disk (HDD).

The analysis server 102 is an example of a computer system and may have, for example, a general computer configuration. In the example of FIG. 1, the analysis server 102 is configured to include a main memory 103, a CPU 104, an auxiliary storage device 106, and a network interface (I/F) 115 for connection to a network, which are connected to each other through a bus.

The main memory 103 is a volatile memory such as a DRAM, and stores programs (command codes) executed by the CPU 104 and data used by the programs. The data (programs are included) stored in the main memory 103 is loaded from, for example, the auxiliary storage device 106 or the external storage device 101. The main memory 103 is configured to include one or a plurality of memory elements (or chips).

The CPU 104 is a processor, and realizes predetermined functions by operating in accordance with programs stored in the main memory 103. The CPU 104 is configured to include one or a plurality of CPU cores (or chips). The auxiliary storage device 106 is configured to include one or a plurality of nonvolatile storage devices such as SSD and HDD.

The main memory 103, the auxiliary storage device 106, or a combination thereof is a storage device of the analysis server 102. The storage device of the analysis server 102, the external storage device 101, or a combination thereof is a storage device of a computer system including the user terminal 100, the external storage device 101, and the analysis server 102.

In the analysis server 102, an operating system (OS) 106 is operated. An analysis platform 107 and a column-level data caching module (CDCM) 109 are operated on the OS 106. Data analysis workflows 108A and 108B are operated within the analysis platform 107.

The data analysis workflows 108A and 108B are included in the analysis platform 107. The data analysis workflow is a data processing workflow. The analysis platform 107 and the CDCM 109 are programs. FIG. 1 shows these programs stored in the main memory 103.

Management information 112 used by the analysis platform 107 or the CDCM 109 is stored in the auxiliary storage device 106. Typically, the management information 112 is referred to by the CPU 104 loaded in the main memory 103. The management information 112 includes a step table 400, an original data table 410, a step instance table 420, an active column subset (ACS) table 430, a cache management table 440, and a cache key table 450. Details of these tables will be described later.

As will be described later, one feature of the present disclosure is caching of intermediate data in the data analysis workflow 108. Cache data is stored in a cache area within a storage device of a computer system. The cache area is secured in, for example, the main memory 103, the auxiliary storage device 106, or the external storage device 101. The storage device may include a dedicated hardware device for cache data.

A program is executed by a processor (CPU) to perform determined processing. Therefore, description with the program as a subject may be description with the processor as a subject. Alternatively, processing executed by a program is processing performed by a computer and a computer system on which the program is operated.

The processor is operated as a functional unit (means) for realizing a predetermined function by being operated according to a program. For example, the processor functions as an analysis platform unit (analysis platform means) by being operated according to the analysis platform 107, and functions as a column level data caching unit (column level data caching means) by being operated according to the CDCM 109.

Figure 2:
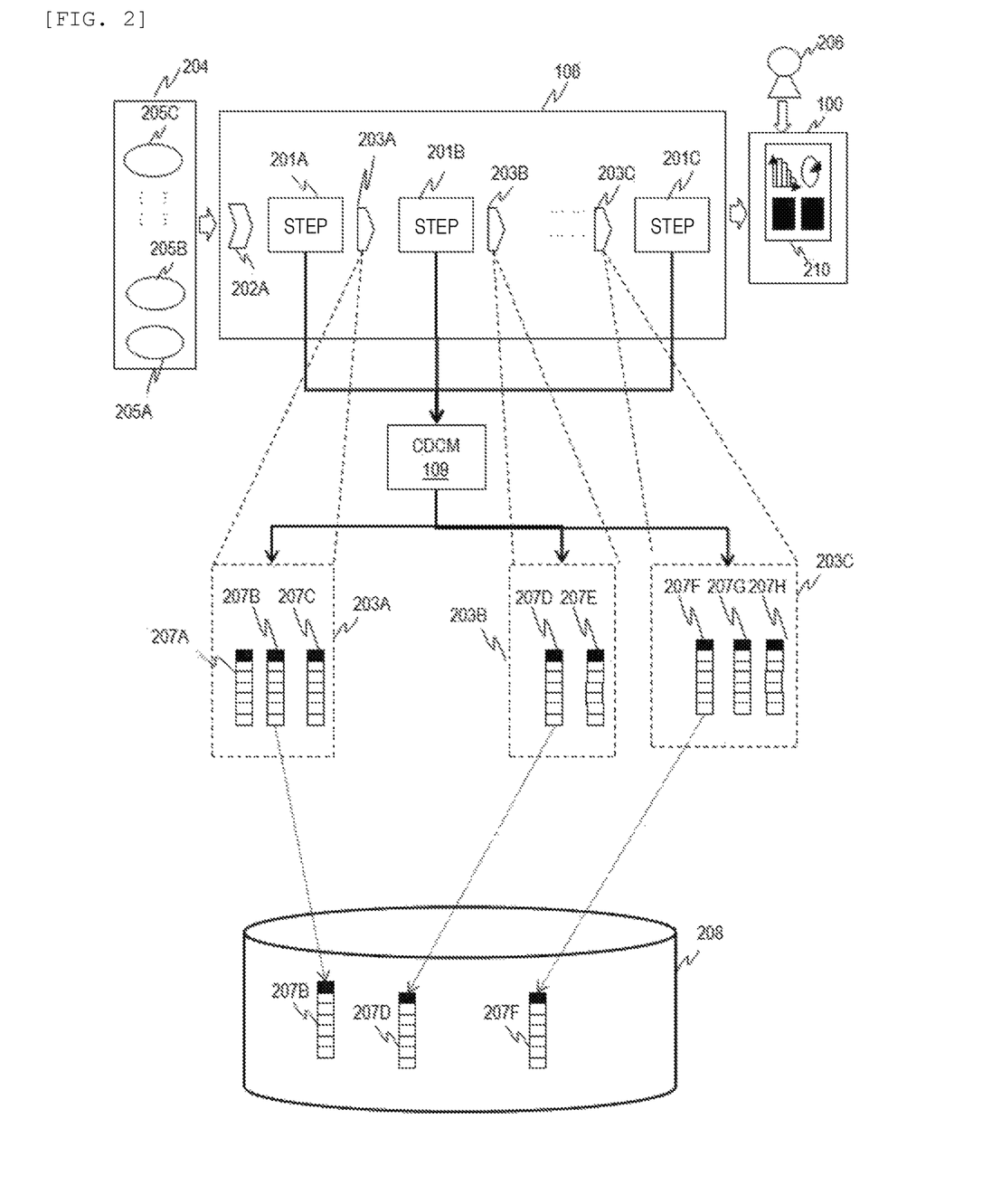
FIG. 2 is a logic diagram schematically showing cache management of the computer system executing big data analysis.

FIG. 2 is a logic diagram schematically showing cache management of the computer system executing big data analysis. Original data 204 is input to the data analysis workflow 108. In this example, the original data 204 is RAW data and is constituted by sensor data 205A to 205C of a plurality of sensors. The original data 204 is transmitted from, for example, the external storage device 101.

The data analysis workflow 108 is configured to include a plurality of step instances 201A to 201C which are sequentially executed. The step instance is also referred to simply as a step in the data processing workflow being executed. The step instance is an arithmetic unit including one or a plurality of functions, and processes input data to generate output data. The output of a step instance other than the final step instance 201C is the input of the next step instance and is intermediate processing data.

The data analysis workflow 108 performs data analysis using the RAW data 204 as an input to generate analysis results used to generate a report 210. The data analysis workflow 108 repeats data analysis for the RAW data 204 under slightly different conditions to generate analysis results of each data analysis.

For example, the analysis platform 107 selects a different input data set 202 from the RAW data 204 in accordance with a user's instruction and inputs the selected input data set to the step instance 201A. For example, the input data set 202 of each analysis is an input data set obtained by adding new data to an input data set of the previous analysis. The data analysis workflow 108 is repeatedly executed again on a different input data set 202.

The data analysis workflow 108 may be executed again from a midway step instance. For example, output data of the immediately preceding step instance and newly added data are input to the midway step instance.

In the example of FIG. 2, the output of the step instance 201C is an output report 210 of the data analysis workflow 108 and is transmitted to the user terminal 100. The analysis platform 107 transmits the report 210 to the user terminal 100 through a network. The user terminal 100 displays the report 210 for a user 206 on a display device.

The input data 202 is input to the step instance 201A. The step instance 201A outputs output data (step output) 203A. The output data 203A is input data of the next step instance 201B. The data 203B is a step output of the step instance 201B and is an input of the next step instance. Data 203C is an output of the step instance immediately before the step instance 201C and is an input of the step instance 201C.

A step output is configured to include one or a plurality of data units. In this example, the data unit is a data column (also referred to simply as a column). The data column is data constituted by one or a plurality of values (elements). For example, in an example of measurement data of a plurality of sensors, time-series of measurement values of one sensor is one data column. Meanwhile, features in the present disclosure can also be applied to data constituted by a data unit different from a data column.

For example, the step output 203A is constituted by columns (data) 207A to 207C, the step output 203B is constituted by columns 207D and 207E, and the step output 203C is constituted by columns 207F to 207H. Hereinafter, reference numeral 21 generically denotes a step instance, reference numeral 203 generically denotes a step output, and reference numeral 207 generically denotes a column.

The step output 203 is constituted by a plurality of columns 207. The columns 207 within the step output 203 are stored independently. As will be described later, some of the step outputs are primarily stored in a cache storage 208 as cache data. The cache storage 208 is constituted by, for example, storage regions of one or a plurality of logic cache devices. An actual cache area is secured in a storage device within the computer system as described above.

The cache data may be used in execution after the data analysis workflow 108. In a case where an output of a step instance is consistent with cache data, the execution of the step instance can be omitted. Alternatively, in a case where a portion of the output of the step instance is consistent with the cache data and only other portions are generated by the step instance, an execution time of the step instance may be shortened.

The CDCM 109 manages and controls the execution of the step instance 201 of the data analysis workflow 108. The analysis platform 107 includes an interface module for communication with the CDCM 109. The CDCM 109 determines data to be cached from output data of the step instance 201 based on information on the step instance 201. The CDCM 109 further determines cache data usable as an output of the step instance 201 based on information on the step instance 201.

Specifically, the CDCM 109 caches output data of the step instance 201 based on the type of the step instance 201 and an input column to be used to generate an output column by the step instance 201. Information on the input column to be used is included in a run-time log of the step instance 201. Caching includes storing all or a portion of output data as cache data and using cache data as all or a portion of output data.

The CDCM 109 stores data selected from a step output in the cache storage 208. As described above, the CDCM 109 executes a data caching process corresponding to the type of the step instance 201.

Typically, the data analysis workflow 108 executes repetitive processing on partially different input data 204. Therefore, it is unlikely that output data can be reused for a step instance in which a change in input data necessarily causes a change in output data. On the other hand, it is more likely that output data can be reused for a step instance in which a change in input data does not necessarily cause a change in output data.

Figure 3A:
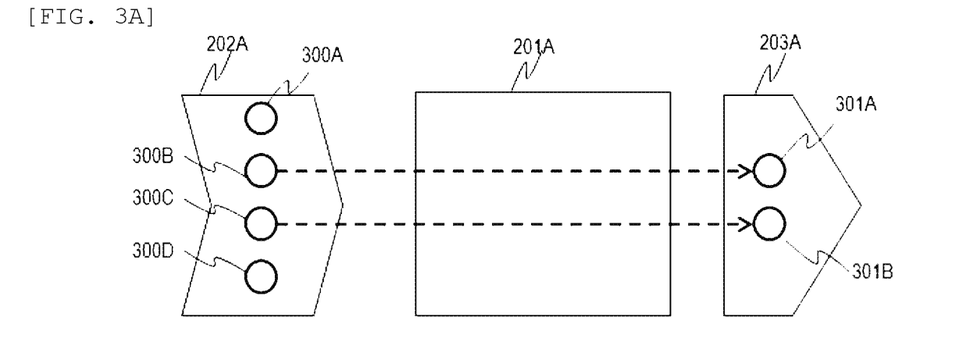
FIG. 3A shows an A type step instance among three step types.

The step instance 201 is classified into three types based on a mapping relationship between an input and an output. The three step types will be described with reference to FIGS. 3A to 3C. FIG. 3A shows an A type step instance 201A among the three step types. The step instance 201A generates output data 203A from input data 202A. The input data 202A is constituted by input columns 300A to 300D. The output data 203A is constituted by output columns 301A and 301B.

The A type step instance 201A generates output columns from only one input column. The output columns are generated from different input columns. For example, the output column 301A is calculated from the input column 300B, and the output column 301B is calculated from the input column 300C.

Addition of one new input column to the input data 200A does not affect the calculation of the existing output columns 3001A and 301B. A new output column different from the existing output columns 301A and 301B may be generated from one new input column. Deleting one existing input column from the input data 200A affects only the calculation of an output column corresponding to an input column to be deleted. Therefore, an output column of a type A is reusable and should to be cached.

Figure 3B:
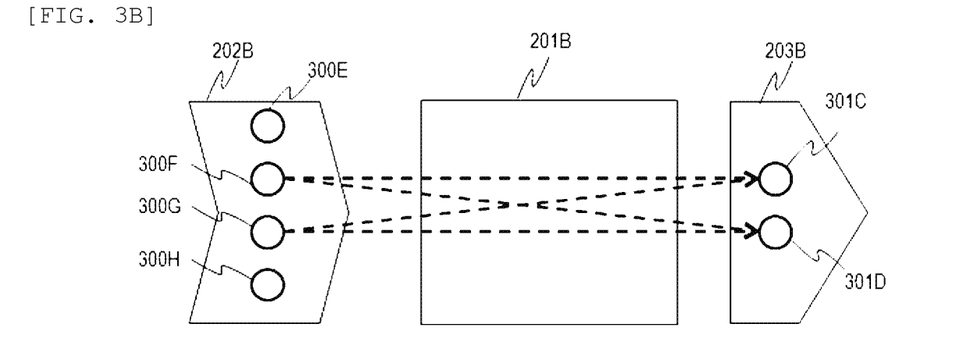
FIG. 3B shows a B type step instance among three step types.

FIG. 3B shows a B type step instance 201B among the three step types. The step instance 201B generates output data 203B from input data 202B. The input data 202B is constituted by input columns 300E to 300H. The output data 203B is constituted by output columns 301C and 301D.

The B type step instance 201B generates one or a plurality of output columns from a plurality of input columns. The output columns are based on a common subset constituted by a plurality of input columns. In the example of FIG. 3B, the output columns 301C and 301D are generated from a subset constituted by input columns 300F and 300G. In this manner, a subset constituted by a plurality of input columns in input data which is used to generate output data by a B type step is called an active column subset (ACS).

Addition of one new input column to the input data 200B may or may not affect calculation of an output column. In a case where an input column to be added is not included in an ACS, the addition of the input column does not affect calculation of an output column. Deleting one existing input column from the input data 200B may or may not affect an output column. In a case where an input column to be deleted is not included in an ACS, the deletion of the input column does not affect the existing output column. Therefore, an output column of a type B is reusable under specific conditions and should be cached.

Figure 3C:
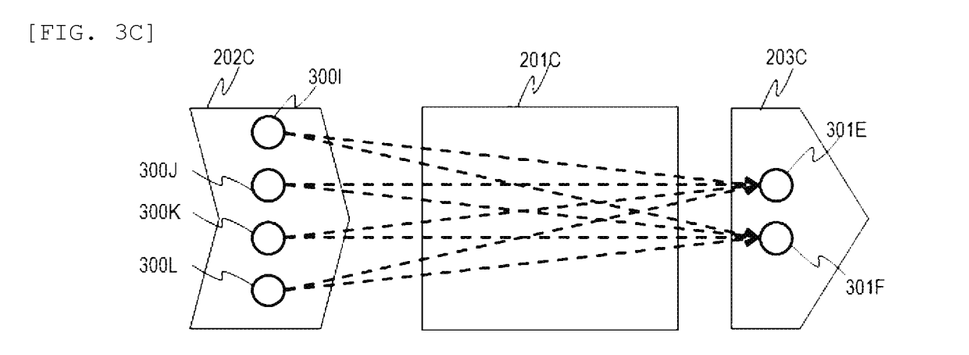
FIG. 3C shows a C type step instance among three step types.

FIG. 3C shows a C type step instance 201C among the three step types. The step instance 201C generates output data 203C from input data 202C. The input data 202C is constituted by input columns 3001 to 300L. The output data 203C is constituted by output columns 301E and 301F.

The C type step instance 201C generates output columns based on all of the input columns. Specifically, each of the output columns 301E and 301F is generated from all of the input columns 3001 to 300L. Addition of one input column to the input data 202C affects calculation of all of the existing output columns.

Similarly, deletion of one input column from the input data 202C also affects calculation of all of the existing output columns. An output column of a type C is not reusable when an input column is changed, and the output column 301 should not be cached. It is possible to reduce the capacity of a cache storage required for the system by removing output data of a C type step from cache data.

Figure 4A:
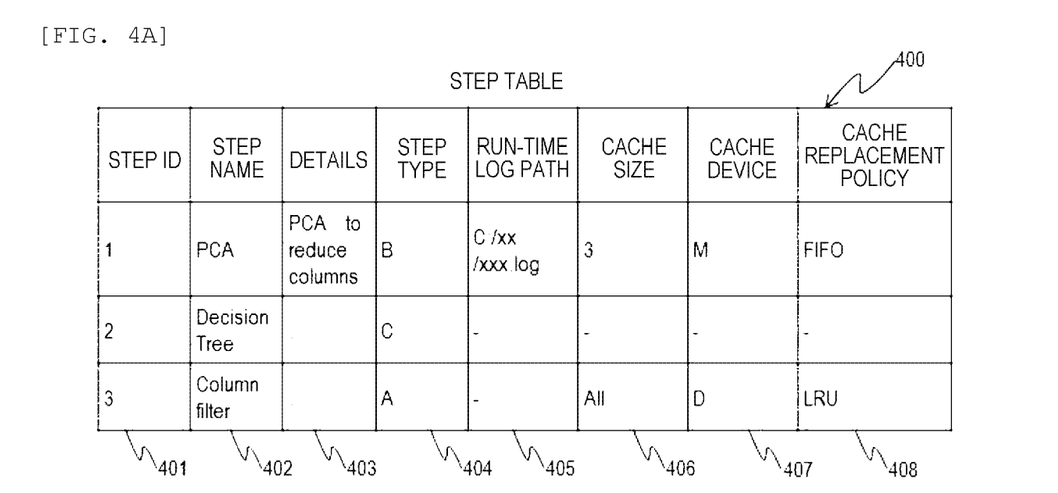
FIG. 4A shows a configuration example of a step table.

Hereinafter, information included in the management information 112 will be described with reference to FIGS. 4A to 4F. FIG. 4A shows a configuration example of the step table 400. The step table 400 manages information on all steps (step classes) usable within the data analysis platform 107.

Records of the step table 400 include a step ID field 401, a step name field 402, a details field 403, a step type field 404, a run-time log path field 405, a cache size field 406, a cache device field 407, and a cache replacement policy field 408.

The step ID field 401 represents a unique ID of a step. The step name field 402 represents the name of a step. The details field 403 represents details of a step. The step type field 404 represents the type of a step. As described above, the type of the step is an A, B, or C type. The run-time log path field 405 represents a location where a run-time log of (an instance of) a step is stored. A step being executed records a run-time log. As will be described later, only a step of a type B records a run-time log.

The cache size field 406 represents the size of output data to be cached, that is, the number of output columns. The cache device field 407 represents a physical device that stores cache data of a step. The cache replacement policy field 408 represents the policy of replacement of cache data. The CDCM 109 controls a cache area in accordance with a cache replacement policy.

In the example of FIG. 4A, the name of a step having a step ID of 1 is PCA. The step is related to PCA for reducing a data column. The type of the step is a B type. A path of a run-time log is "C:/xx/xxx.log". A cache size is 3, and a cache area is the main memory 103 indicated by "M". Cache replacement conforms to first in first out (FIFO).

The step table 400 is initialized by a system provider and presented to a user through a GUI or another method. The user can change information on a step in the step table 400 or can add a new step.

Figure 4B:
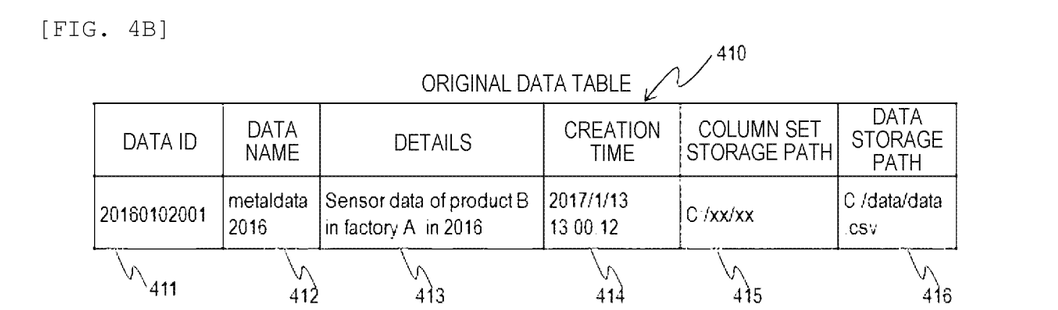
FIG. 4B shows a configuration example of an original data table.

FIG. 4B shows a configuration example of the original data table 410. The original data table 410 manages information on original data which is an input to a data analysis workflow. The original data table 410 is created by a user.

Records of the original data table 410 include a data ID field 411, a data name field 412, a details field 413, a creation time field 414, a column set storage path field 415, and a data storage path field 416.

The data ID field 411 represents a unique ID of original data. The data name field 412 represents the name of original data. The details field 413 represents details of original data. The creation time field 414 represents the time when a record is created. The column set storage path field 415 represents a location where an input column set generated from original data and input to the first step is stored. The data storage path field 416 represents a location where original data itself is stored.

In the example of FIG. 4B, the name of original data having a data ID of "20160102001" is "metaldata2016". This data is sensor data of a product B in a factory A in 2016. A record is created in "2017/1/13 13:00:12". A data column set is stored in "C:/xx/xx", and the original data itself is stored in "C:/data/data.csv".

Figure 4C:
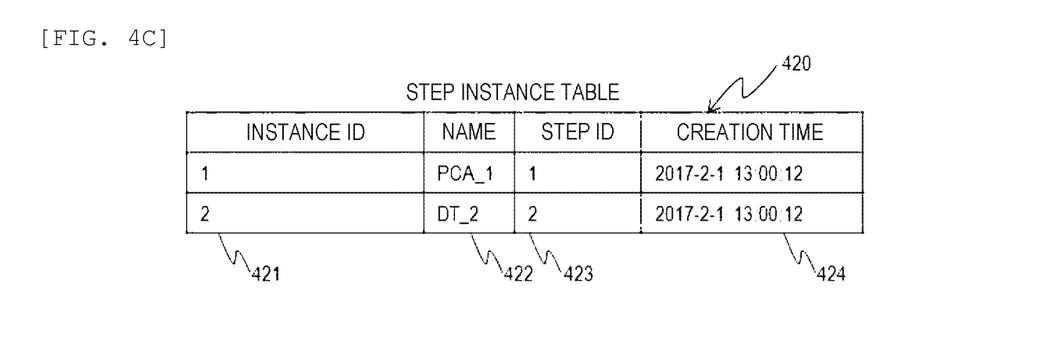
FIG. 4C shows a configuration example of a step instance table.

FIG. 4C shows a configuration example of the step instance table 420. The step instance table 420 manages information on all step instances included in the data analysis workflow 108. For example, the CDCM 109 acquires the information from the data analysis workflow 108 to create the step instance table 420.

Records of the step instance table 420 include an instance ID field 421, a name field 422, a step ID field 423, and a creation time field 424. The instance ID field 421 represents a unique ID of a step instance. The name field 422 represents the name of an instance. The step ID field 423 represents an ID of a step in which an instance is generated. The creation time field 424 represents the time when an instance is created.

In the example of FIG. 4C, the name of a step instance having an ID of "1" is "PCA 1". The step instance is generated from a step PCA having a step ID of "1". The step instance is created in "2017-2-1 13:00:12".

Figure 4D:
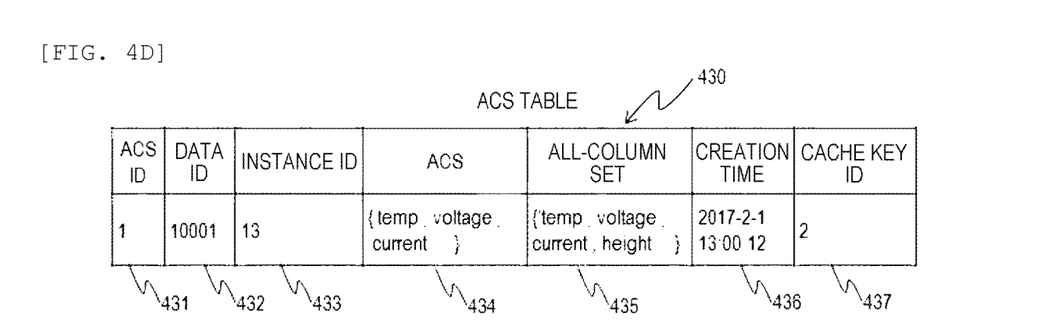
FIG. 4D shows a configuration example of an ACS table.

FIG. 4D shows a configuration example of the ACS table 430. The ACS table 430 manages information on all ACSes. As described above, an ACS is an input column subset used to generate output data by a step B. An output column generated from the ACS is cached. The CDCM 109 manages the ACS table 430 and acquires information from the data analysis workflow 108 to update the ACS table 430.

Records of the ACS table 430 include an ACS ID field 431, a data ID field 432, an instance ID field 433, an ACS field 434, an all-column set field 435, a creation time field 436, and a cache key ID field 437.

The ACS ID field 431 represents a unique ID of an ACS. The data ID field 432 represents an ID of original data for generating an ACS. The instance ID field 433 represents an ID of a step instance 201 to which an ACS is input (used). The ACS field 434 represents an input column constituting an ACS.

The all-column set field 435 represents all input columns to a step instance. A portion of an all-column set is an active column subset. The creation time field 436 represents the time when a record is created. The cache key ID field 437 represents a cache key ID of cache data of output data corresponding to an ACS. The cache key ID will be described later. The output data corresponding to the ACS is output data generated from the ACS by a step instance.

In the example of FIG. 4D, an ACS having an ID of "1" is generated by a step instance having an ID of "13" from original data having an ID of "10001". Input columns constituting the ACS are {"temp", "voltage", "current", . . . }. All input columns to the step instance are {"temp", "voltage", "current", "height" . . . }. A record of the ACS is created in "2017-2-1 13:00:12". Cache data of output data corresponding to the ACS is associated with a cache key ID of "2".

Figure 4E:
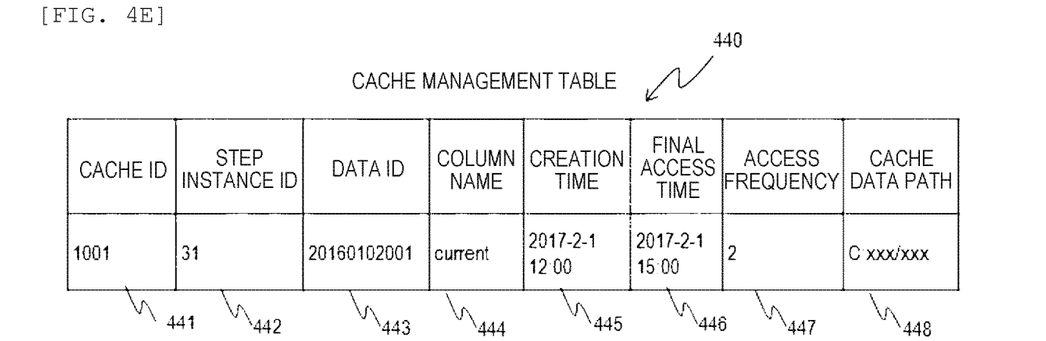
FIG. 4E shows a configuration example of a cache management table.

FIG. 4E shows a configuration example of the cache management table 440. The cache management table 440 manages all data cached in the cache storage 208. The CDCM 109 manages and updates the cache management table 440.

Records of the cache management table 440 include a cache ID field 441, a step instance ID field 442, a data ID field 443, a column name field 444, a creation time field 445, a final access time field 446, an access frequency field 447, and a cache data path field 448.

The cache ID field 441 represents a unique ID of cache data. The step instance ID field 442 represents an ID of a step instance generating cache data. The data ID field 443 represents an ID of original data from which cache data is generated. The column name field 444 represents the name of each of output columns constituting cache data.

The creation time field 445 represents the time when data is cached. The final access time field 446 represents the time of final access (read) to cache data. The access frequency field 447 represents the number of times cache data is read. The final access time and the access frequency are referred to for cache replacement. The cache data path field 448 represents a location where cache data is stored.

In the example of FIG. 4E, cache data having an ID of "1001" is generated by a step instance having an ID of "31" from original data having an ID of "20160102001". The name of a cached output column is "current". The cache data in this example is constituted by one output column.

The data is cached in "2017-2-1 12:00", and the final access time of the cached data is "2017-2-1 15:00". The cache data is accessed twice. The cache data is stored in "C:/xxx/xxx".

Figure 4F:
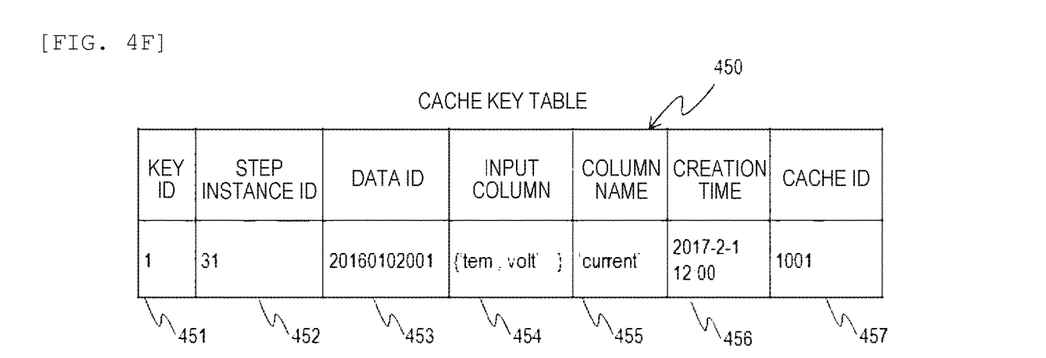
FIG. 4F shows a configuration example of a cache key table.

FIG. 4F shows a configuration example of the cache key table 450. The cache key table 450 manages a cache key for checking a cache hit and detecting cache data within the cache storage 208.

Records of the cache key table 450 include a key ID field 451, a step instance ID field 452, a data ID 453, an input column field 454, a column name field 455, a creation time field 456, and a cache ID field 457.

The key ID field 451 represents a unique ID of a cache key. The step instance ID field 452 represents an ID of a step instance associated with a cache key. The data ID 453 represents an ID of related original data. The input column field 454 represents all input columns to a step instance in generating cache data associated with a cache key.

For example, in a case where a step instance of a type A or a type B generates a plurality of output columns from a plurality of input columns, the names of the plurality of input columns are stored in the input column field 454. The input column field 454 stores information on input data before being selected as a step instance for generating output data. The output columns of the step instance of the type A are generated from only one input column. In a case where information on one input column corresponding to one output column can be acquired from the analysis platform 107, the CDCM 109 stores the name of the input column in the input column field 454.

The column name field 455 represents the names of all output columns of cache data associated with a cache key. One column name field 455 may represent only one output column name. That is, one record may be created for only one output column. The creation time field 456 represents the time when related cache data is cached. The cache ID field 457 represents an ID of cache data associated with a cache key.

In the example of FIG. 4F, a cache key having an ID of "1" is mapped to cache data having an ID of "1001". The cache data is generated by a step instance having an ID of "31" from original data having an ID of "20160102001". Input columns input to the step instance for generating the cache data are {"tem", "volt", . . . }. The number of output columns generated and cached is one, and the name thereof is "current". The cache data is cached in "2017-2-1 12:00".

Figure 5A:
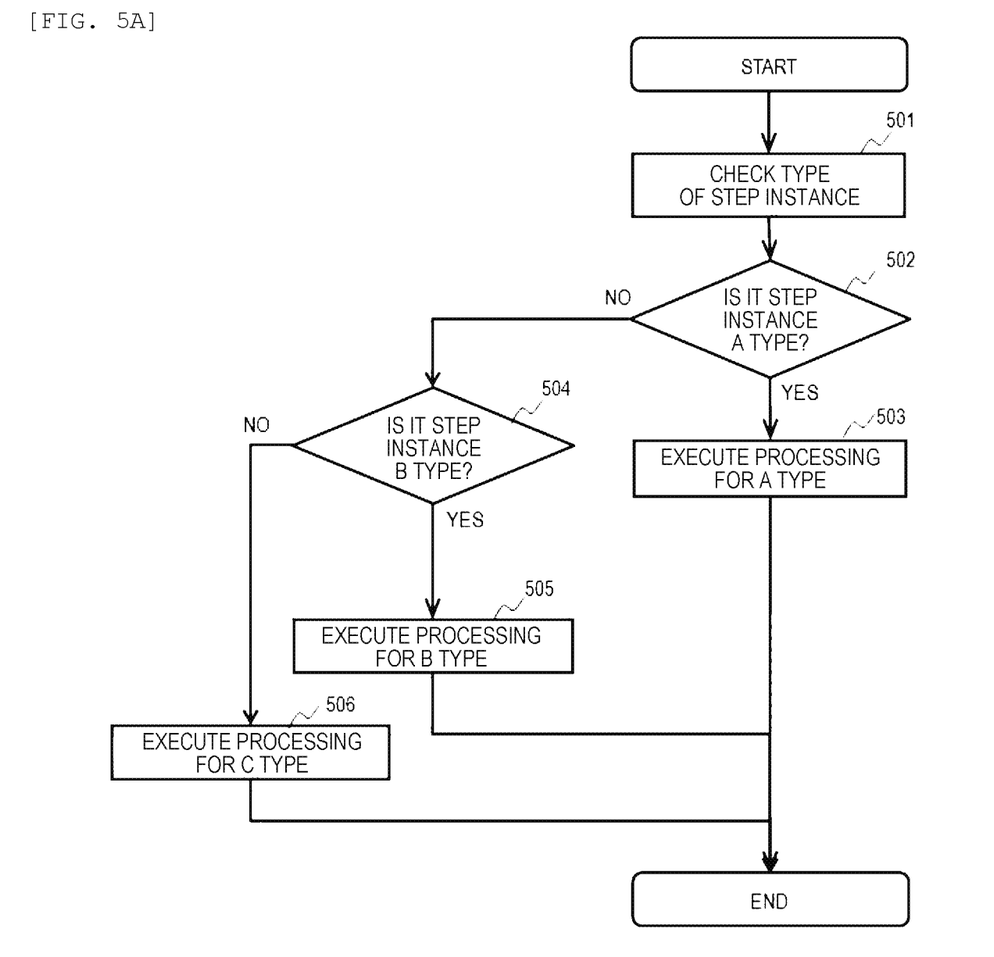
FIG. 5A is a flowchart showing an outline of cache checking of a step.

FIG. 5A is a flowchart showing an outline of cache checking of a step. The CDCM 109 is operated according to the flowchart shown in FIG. 5A for steps of the data analysis workflow 108. The analysis platform 107 transfers information on the present step instance 201 to the CDCM 109 before a step instance (present step instance) to be executed next is executed. The analysis platform 107 controls the execution of the present step instance 201 in response to an instruction of the CDCM 109.

First, the CDCM 109 determines a step type of the present step instance 201 before execution (501). Specifically, the CDCM 109 acquires an ID of the present step instance from the analysis platform 107. The CDCM 109 identifies a step ID of the present step instance 201 with reference to the step instance table 420. The CDCM 109 identifies a step type of the identified step ID with reference to the step table 400.

In a case where the step type of the present step instance 201 is an A type (502: YES), the CDCM 109 executes processing for the A type (503). In a case where the step type of the present step instance 201 is a B type (502: NO, 504: YES), the CDCM 109 executes processing for the B type (505). In a case where the step type of the present step instance 201 is a C type (502: NO, 504: NO), the CDCM 109 executes processing for the C type (506).

Figure 5B:
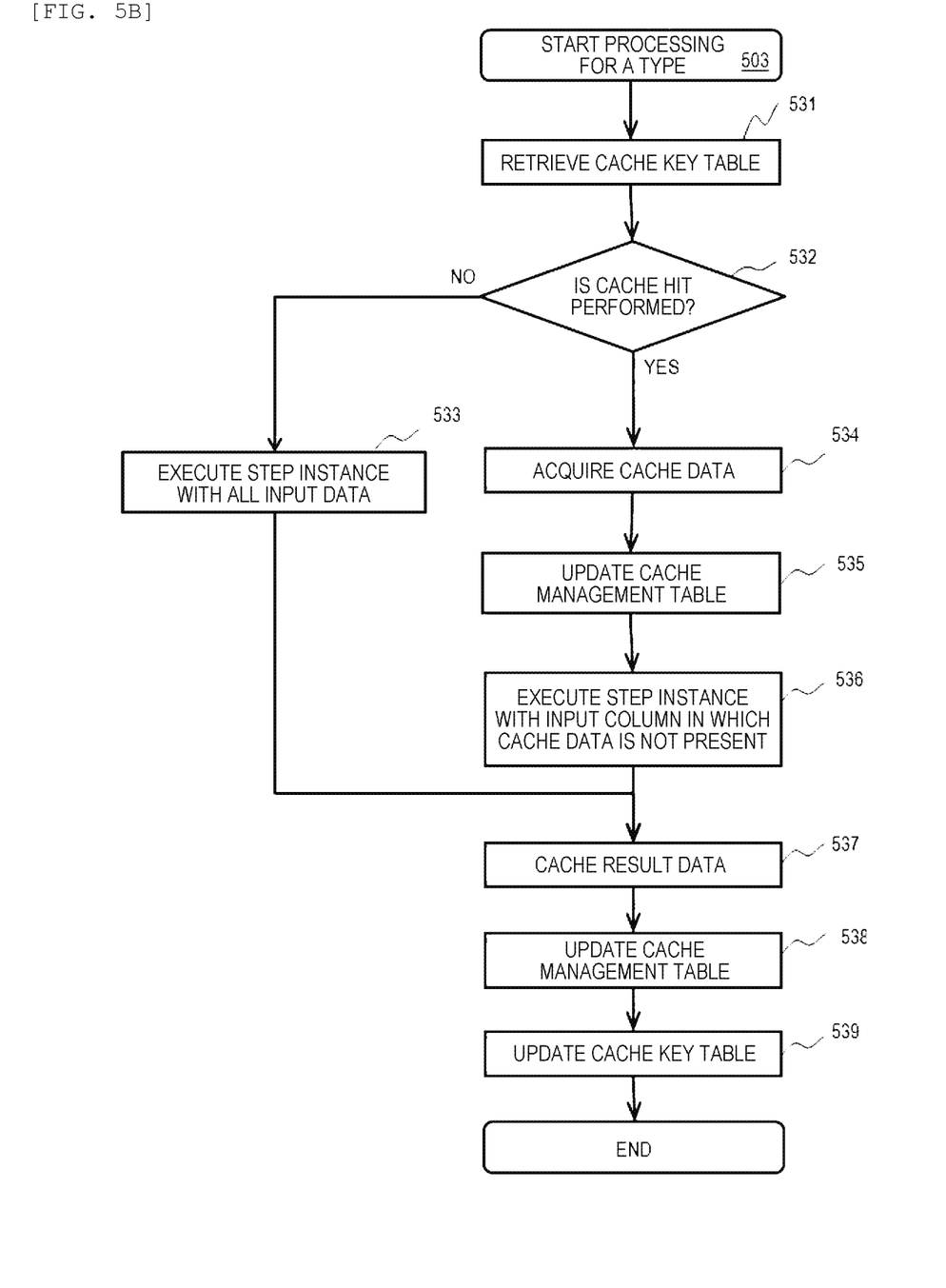
FIG. 5B shows a flowchart of processing for an A type step instance.

FIG. 5B shows a flowchart of the processing 503 for the A type. The A type step instance generates output columns from only one input column. The CDCM 109 retrieves cache data corresponding to the present input data for the present step instance 201 and uses the cache data as (a portion or the entirety of) an output of the present step instance in a case where the cache data is present.

First, the CDCM 109 acquires information on an input column full set to the present step instance 201 from the analysis platform 107. The CDCM 109 has already acquired a step instance ID as described above. The CDCM 109 acquires an ID of target original data from the analysis platform 107 before the data analysis workflow 108 is started.

The CDCM 109 retrieves, in the cache key table 450, a record in which the values of the step instance ID field 452 and the data ID field 453 are respectively consistent with the ID of the present step instance and the ID of the original data and the value of the input column field 454 is included in an input full column set to the present step instance (531).

In a case where a record satisfying the above-described conditions is not present (532: NO), the CDCM 109 instructs the analysis platform 107 to execute the present step instance for all of the input columns. The present step instance 201 generates output data constituted by one or a plurality of output columns from the input column full set (533).

The CDCM 109 acquires all output data (constituted by one or a plurality of output columns) of the present step instance 201 from the analysis platform 107. The CDCM 109 stores all the acquired output data in a specific cache area (537). The cache data can be used in the subsequent execution of the step instance. The CDCM 109 adds a record for output data to the cache management table 440 (538).

The cache ID field 441 stores a unique new value, and the step instance ID field 442 and the data ID field 443 respectively store the ID of the present step instance and the ID of the original data. The column name field 444 stores the names of all of the output columns. The cache data path field 448 represents a path to a cache area in which output data is stored.

The CDCM 109 adds a record for newly cached data (new cache ID) to the cache key table 450. The CDCM 109 stores the names of all of the present input columns in the input column field 454 and stores the names of all of the output columns in the column name field 455.

In step 532, in a case where a record satisfying the above-described conditions is present (532: YES), the CDCM 109 acquires cache data of all records satisfying the above-described conditions (534). Specifically, the CDCM 109 retrieves the value of a cache ID 457 of a record, which is hit in the cache key table 450, in the cache management table 440. The CDCM 109 acquires the value of the cache data path 448 of the record detected in the cache management table 440 to acquire cache data from the path.

The CDCM 109 updates the record of the cache data for which a cache hit is performed in the cache management table 440 (535). Specifically, the CDCM 109 updates the values of the final access time 446 and the access frequency 447.

The CDCM 109 determines that the acquired cache data is included in output data for the present input data of the present step instance. The CDCM 109 transfers the acquired cache data to the analysis platform 107 together with information on the corresponding input data (constituted by one or a plurality of input columns).

In a case where a portion of the present input column full set is not subjected to a cache hit, the CDCM 109 designates a portion of the input data and instructs the analysis platform 107 to execute the present step instance. The designated portion of the data is constituted by one or a plurality of input columns. The data analysis workflow 108 executes the present step instance on the designated portion of the input data under the control of the analysis platform 107 (536). The cache data and the newly generated data constitute the present output data of the present step instance for the present input data.

The CDCM 109 acquires output data of the present step instance from the analysis platform 107. The CDCM 109 stores the acquired output data in a specific cache area (537). The cache data can be used in the subsequent execution of the step instance. The CDCM 109 adds a record for output data to the cache management table 440 (538). The column name field 444 stores the names of output columns constituting the acquired output data, that is, output data generated for a portion of the input data.

The CDCM 109 adds a record for newly cached data (new cache ID) to the cache key table 450. The CDCM 109 stores the names of input columns constituting a portion of the input data used to generate the output data in the input column field 454. The CDCM 109 stores the names of output columns constituting the output data generated for a portion of the input data in the column name field 455.

In a case where the present input data is a portion of an input column set represented by the input column field 454 of one existing record in the cache key table 450, the present step instance is executed for the present input data. The CDCM 109 caches new output data (present output data) and adds information on cache data to the cache management table 440 and the cache key table 450.

Figure 5C:
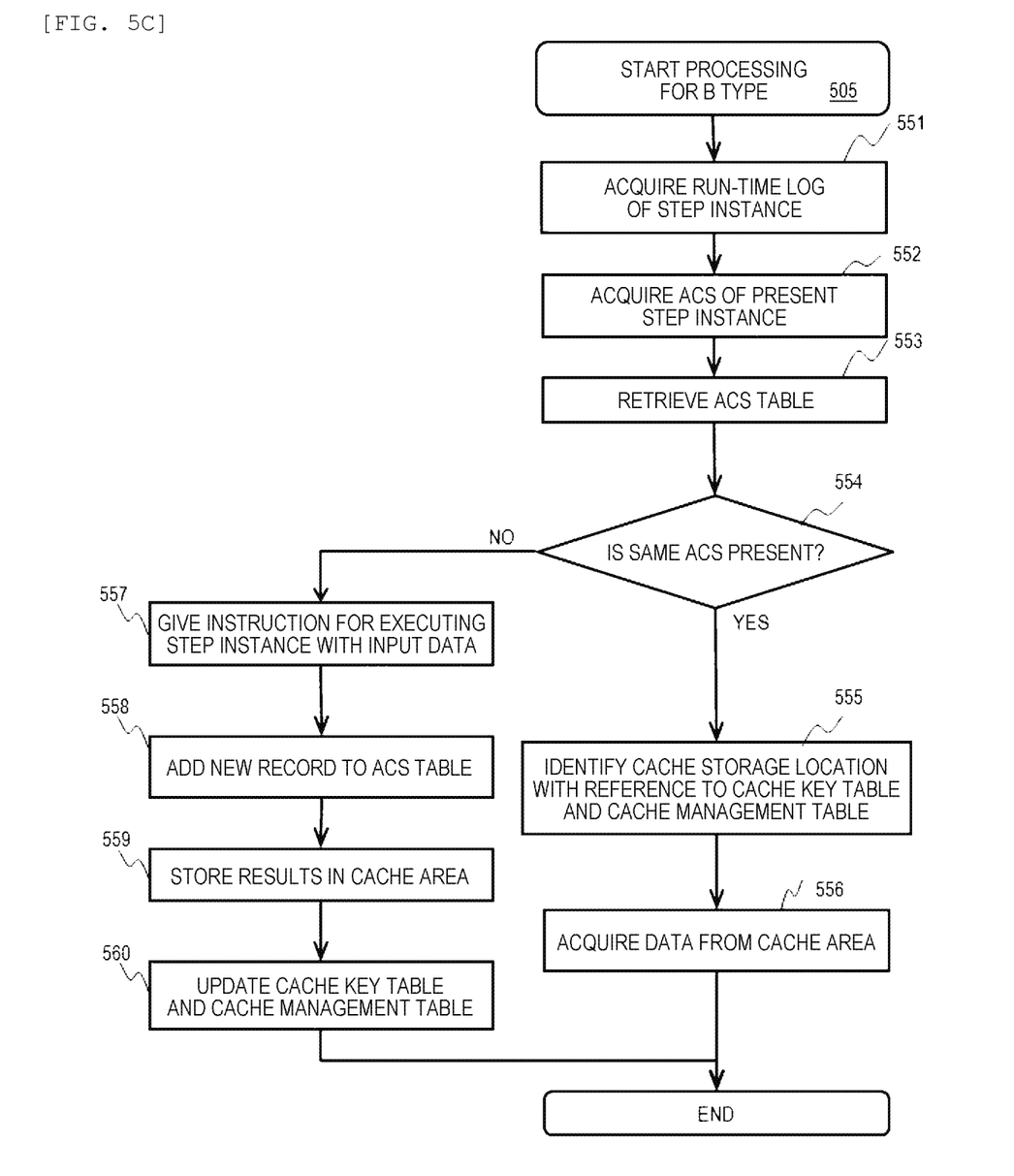
FIG. 5C shows a flowchart of processing for a B type step instance.

Next, the processing 505 for the B type will be described with reference to FIG. 5C. FIG. 5C shows a flowchart of the processing 505 for the B type. The B type step instance generates each of output columns from a plurality of common input columns. The CDCM 109 retrieves cache data corresponding to the present ACS for the present step instance 201 and uses the cache data as an output of the present step instance in a case where the cache data is present.

The CDCM 109 acquires a run-time log of the present step instance 201 (551). Specifically, the CDCM 109 identifies an instance ID of the present step instance with reference to the step ID field 423 of the step instance table 420. The CDCM 109 further identifies a location where the run-time log of the present step instance is stored, with reference to the run-time log path field 405 of the step table 400.

The CDCM 109 acquires the run-time log of the present step instance 201 from the identified storage location. The B type step instance is configured to store information on the ACS in the run-time log and then temporarily stop without executing arithmetic processing for the ACS. The CDCM 109 acquires the information on the ACS of the present step instance from the acquired run-time log (552).

Next, the CDCM 109 retrieves a record matching the ACS of the present step instance in the ACS table 430 (553). Specifically, the CDCM 109 retrieves a record in which the values of the data ID field 432, the instance ID field 433, and the ACS field 434 are consistent with the respective values of the present step instance.

In a case where a record matching the ACS table 430 is present (554: YES), the CDCM 109 identifies a location where cache data is stored, with reference to the cache key table 440 and the cache management table 450 (555).

Specifically, the CDCM 109 acquires a cache key ID of the record from the cache key ID field 437 of the ACS table 430. The CDCM 109 retrieves the cache key ID in the cache key table 440. The CDCM 109 acquires a cache ID from the cache ID field 457 of the record in the cache key table 440 and retrieves the cache ID in the cache management table 450. The CDCM 109 acquires a cache data path from the cache data path field 448 of the record in the cache management table 450.

The CDCM 109 acquires cache data from a location represented by the cache data path and determines the cache data as output data of the present step (556). The CDCM 109 transfers the acquired cache data to the analysis platform 107. The analysis platform 107 skips the execution of the present step instance and uses the acquired cache data as output data of the present step instance. The CDCM 109 further updates the final access time field 446 and the access frequency field 447 in the record of the cache management table 440.

In step 554, in a case where a record matching the ACS of the present step instance is not present (554: NO), the CDCM 109 determines to execute the present step instance on the present input data and instructs the analysis platform 107 to execute the present step instance (557). The analysis platform 107 restarts the execution of the present step instance being temporarily stopped in response to an instruction given from the CDCM 109.

The CDCM 109 adds a record in which information on the ACS of the present step instance is stored to the ACS table 430 (558). Further, the CDCM 109 acquires output data (arithmetic operation results) of the present step instance from the analysis platform 107 and stores the acquired output data in a specific cache area (559). The cache data can be used in the subsequent execution of the step instance. The CDCM 109 adds a record indicating stored new cache data to the cache management table 440 and the cache key table 450.

As described above, the output columns of the B type step instance 201 can be generated by acquiring data cached from the cache area or by performing completely new execution of the present step instance with all of the input columns.

The CDCM 109 can specify a case where input columns of the same step instance are different from each other but the ACSes thereof are the same, with reference to the ACS table 430. In this case, it is possible to shorten an execution time of the data analysis workflow 108 by using cache data again.

Figure 5D:
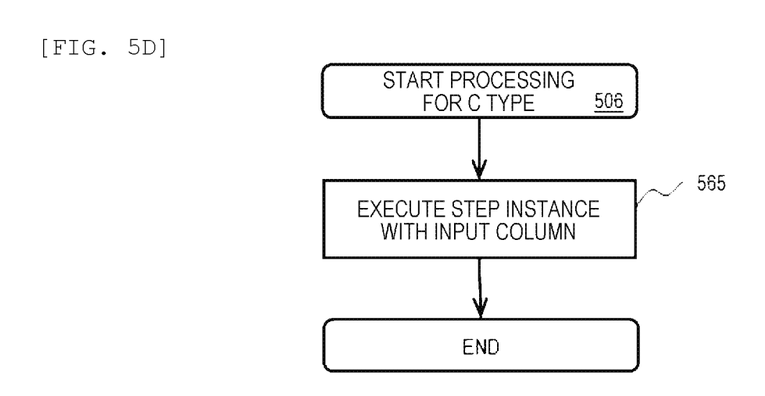
FIG. 5D shows a flowchart of processing for a C type step instance.

Next, the processing 506 for the C type will be described with reference to FIG. 5D. FIG. 5D shows a flowchart of the processing 506 for the C type. The C type step instance generates each of output columns from all input columns. All of the output columns may change due to a change in only one input column. Therefore, the CDCM 109 excludes output data of the C type step instance from data to be cached. Thereby, it is possible to reduce the capacity of a cache area.

As shown in FIG. 5D, the CDCM 109 instructs the analysis platform 107 to execute the present step instance 201 using all of the present input columns. The analysis platform 107 executes the present step instance in response to an instruction given from the CDCM 109 (565). Meanwhile, the analysis platform 107 may determine the type of present step instance and execute the C type step instance without communicating with the CDCM 109.

Meanwhile, the present invention is not limited to the examples described above and includes various modification examples. For example, the example described above is described in detail for easy understanding of the present invention and is not necessarily limited to that including all configurations described above. A portion of a configuration of a certain example can be substituted for a configuration of another example, and it is also possible to add a configuration of another example to a configuration of a certain example. With respect to a portion of the configuration of each example, other configurations can be added, deleted, and substituted.

With regard to the above-described configurations, functions, processing units, and the like, a portion or the entirety thereof may be realized by hardware, for example, by being designed as an integrated circuit. Further, the above-described configurations, functions, and the like may be realized using software by a processor analyzing and executing a program for realizing each of the functions. Information such as programs, tables, and files for realizing the functions can be placed in a recording device such as a memory, a hard disk, or a solid state drive (SSD) or a storage medium such as an IC card or an SD card.

Control lines and information lines that are assumed to be necessary for the sake of description are illustrated, but not all the control lines and the information lines on a product are illustrated. Actually, it may be considered that almost all the components are connected to each other.

The invention claimed is:

1. A computer system performing cache management of intermediate data in a data processing workflow in which a plurality of steps are sequentially executed, the computer system comprising:
a storage device that includes a cache area for storing cache data; and
a processor that is operated in accordance with a command code stored in the storage device, wherein
the storage device stores a run-time log of a first step being executed among the plurality of steps and management information indicating a relationship between an input subset which is a portion of input data to the first step and is constituted by a plurality of data units and cache data of output data of the first step for the input subset,
output data units of the first step are generated from the input subset, and
the processor acquires information on a first present input subset selected from first present input data for the first step from the run-time log of the first step, determines whether or not first cache data corresponding to the first present input subset for the first step is present in the cache area with reference to the management information, and determines the first cache data as present output data for the first present input data in a case where the first cache data is present.

2. The computer system according to claim 1, wherein
in a case where the management information indicates absence of the first cache data, the processor acquires the output data of the first step for the first present input data, stores the acquired output data in the cache area as new cache data, and updates the management information so as to indicate a relationship between the new cache data and the first present input subset.

3. The computer system according to claim 1, wherein
the management information further indicates a type of each of the plurality of steps,
the types of the plurality of steps include a first type and a second type,
the type of the first step is the second type,
output data units of the step of the second type are generated from a plurality of input data units which are a portion of input data,
the management information indicates a relationship between an input subset and cache data of output data with respect to the step of the second type,
the processor determines a type of the present step being executed with reference to the management information, and
in a case where the present step is the step of the second type, the processor acquires information on a second present input subset selected from second present input data for the present step from a run-time log of the present step, determines whether or not cache data corresponding to the second present input subset for the present step is present in the cache area with reference to the management information, and determines the cache data as output data for the second present input data in a case where the cache data is present.

4. The computer system according to claim 3, wherein
output data units of a step of the first type are generated from one input data unit,
the management information indicates a relationship between input data and cache data of output data with respect to the step of the first type, and
in a case where the present step is the step of the first type, the processor identifies a hit portion in which corresponding cache data is present in third present input data for the present step with reference to the management information, executes processing of the present step on a portion different from the hit portion in the third present input data to acquire a result output, and determines the result output and cache data corresponding to the hit portion as output data for the third present input data.

5. The computer system according to claim 3, wherein
the types of the plurality of steps include a third type,
output data units of the step of the third type are generated from all of the input data, and
the processor holds cache data of output data of the steps of the first type and the second type except for the third type.

6. A method of causing a computer system to perform cache management of intermediate data in a data processing workflow in which a plurality of steps are sequentially executed,
wherein the computer system holds:
a cache area for storing cache data;
a run-time log of a first step being executed among the plurality of steps; and
management information indicating a relationship between an input subset which is a portion of input data to the first step and is constituted by a plurality of data units and cache data of output data of the first step for the input subset, and
output data units of the first step are generated from the input subset,
the method comprising causing the computer system to:
acquire information on a first present input subset selected from first present input data for the first step from the run-time log of the first step;
determine whether or not first cache data corresponding to the first present input subset for the first step is present in the cache area with reference to the management information; and
determine the first cache data as present output data for the first present input data in a case where the first cache data is present.

7. The method according to claim 6, wherein
in a case where the management information indicates absence of the first cache data, the computer system acquires the output data of the first step for the first present input data, stores the acquired output data in the cache area as new cache data, and updates the management information so as to indicate a relationship between the new cache data and the first present input subset.

8. The method according to claim 6, wherein
the management information further indicates a type of each of the plurality of steps,
the types of the plurality of steps include a first type and a second type,
the type of the first step is the second type,
output data units of the step of the second type are generated from a plurality of input data units which are a portion of input data, and
the management information indicates a relationship between an input subset and cache data of output data with respect to the step of the second type,
the method further comprising causing the computer system to:
determine a type of the present step being executed with reference to the management information,
the method further comprising, in a case where the present step is the step of the second type, causing the computer system to:
acquire information on a second present input subset selected from second present input data for the present step from a run-time log of the present step;
determine whether or not cache data corresponding to the second present input subset for the present step is present in the cache area with reference to the management information; and
determine the cache data as output data for the second present input data in a case where the cache data is present.

9. The method according to claim 8, wherein
output data units of a step of the first type are generated from one input data unit, and
the management information indicates a relationship between input data and cache data of output data with respect to the step of the first type,
the method further comprising, in a case where the present step is the step of the first type, causing the computer system to:
identify a hit portion in which corresponding cache data is present in third present input data for the present step with reference to the management information;
execute processing of the present step on a portion different from the hit portion in the third present input data to acquire a result output; and
determine the result output and cache data corresponding to the hit portion as output data for the third present input data.

10. The method according to claim 8, wherein
the types of the plurality of steps include a third type, and
output data units of the step of the third type are generated from all of the input data,
the method further comprising causing the computer system to hold cache data of output data of the steps of the first type and the second type except for the third type.

* * * * *